LEVEL CONTROL FOR SUBSCRIBER CARRIER SYSTEM

Filed Feb. 10, 1966 2 Sheets-Sheet 1

INVENTOR
J. M. GODFREY
BY
ATTORNEY

LEVEL CONTROL FOR SUBSCRIBER CARRIER SYSTEM

Filed Feb. 10, 1966 2 Sheets-Sheet 2

United States Patent Office 3,496,308
Patented Feb. 17, 1970

3,496,308

LEVEL CONTROL FOR SUBSCRIBER CARRIER SYSTEM

John M. Godfrey, West Acton, Mass., assignor to International Telephone and Telegraph Corporation Filed Feb. 10, 1966, Ser. No. 526,484
Int. Cl. H04b 3/38, 3/58
U.S. Cl. 179—170 6 Claims

ABSTRACT OF THE DISCLOSURE

A device is provided for maintaining the signal level of telephone messages over remote lines. Means, including variolossers, are employed to automatically adjust the gain of amplifiers in the lines to compensate for variations in losses in the lines.

Figure 1:
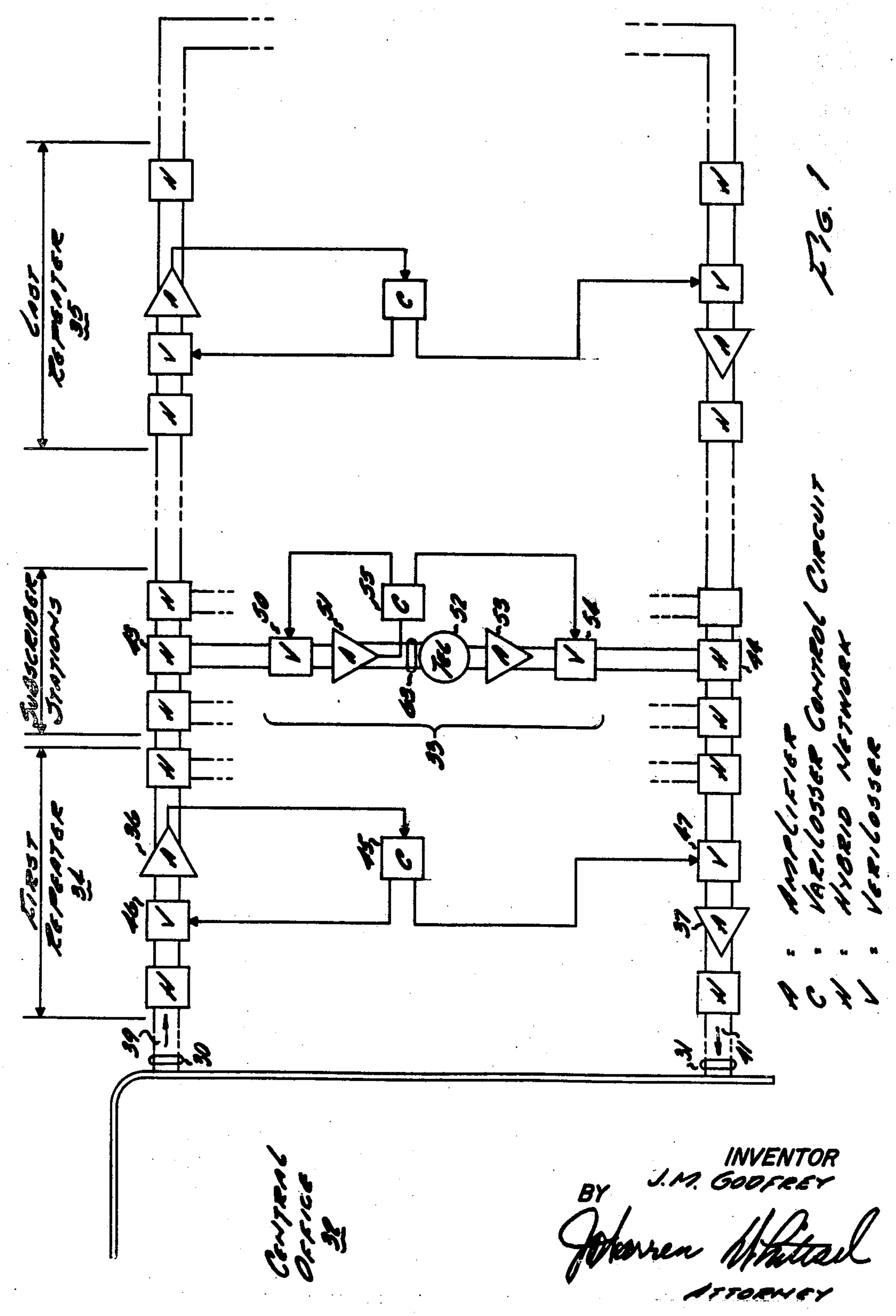

This invention relates to subscriber carrier systems and more particularly to automatic gain control for both the receivers and transmitters in such systems.

A subscriber carrier system is used to extend voice paths from a telephone central office to a plurality of remotely located subscriber stations. The exact nature of the transmission medium or carrier channel used to provide the voice paths is incidental; it could be a wire line, radio, or microwave link, or the like. Therefore, the term "line" is generically used herein to described all of these and other media.

Rural telephone systems exemplify the environment in which subscriber carrier systems must operate. The lines are long, the subscribers live far apart, and the subscriber stations are coupled into the line at random spacing along the lines. Moreover, some of the lines are new, some are old. Some are in areas of dampness, others are in areas of dryness. Many other environmental conditions will also affect the transmission characteristics of the line. Therefore, it is not possible to make a single static adjustment for averaging the gain of all repeaters with any high degree of assurance that they will either be balanced or provide the correct gain for any given connections. Even if conditions were such that an average setting could be used, it would not be possible to make the settings and then ignore them forever after. For example, component characteristics drift with age, temperature, humidity, and the like. Also, increase or decrease in traffic could have an affect upon the repeater settings. Therefore, dynamic gain control adjustments are required.

The communication is carried on over two-way paths but the gain is provided by amplifiers which are inherently one-way devices. For this reason, it is customary to provide two, one-way line branches so that two-way communication may be accomplished. Therefore, the gain of two amplifiers must be adjusted for each repeater. In the line, one amplifier conducts east-west signals and the other conducts west-east signals. Likewise, at each remote station, the subscriber equipment is coupled into the line via two amplifiers which are also used to bring the voice signals up to a predetermined gain. In theory, all signals—both on the line and at the station—are brought to an exact level regardless of the conditions previously experienced by the signal. However, this is not always possible; therefore, the system must be able to cope with original non-standard conditions.

For these and other reasons, it is desirable to provide means for automatically and dynamically controlling the gain of both amplifiers at each repeater and subscriber station used in the system. The gain control adjusting means must raise or lower the gain of both of the amplifiers as a function of both the permanent and the ambient environmental conditions. The permanent conditions relate to the line length, type of equipment used, etc. The ambient environmental conditions include fluctuation in raffic, temperature, humidity etc.

Accordingly, an object of the invention is to provide new and improved amplifier gain adjustment systems. More particularly, an object is to provide automatic gain control for amplifiers used in receivers and especially—although not exclusively—for subscriber carrier receivers and repeaters. In this connection, an object is to provide means for automatically and immediately compensating for all fluctuations and variations in signal strength regardless of the cause of such fluctuations and variations.

A related object is to accomplish these and other objects at low cost in a simple and reliable manner through the use of standard and readily available equipment. Here, an object is to provide the high degree of reliability required by a public utility communication network.

According to one aspect of the invention, these and other objects are accomplished by means of an amplifier gain control circuit which continuously monitors the signals on a first one-way line branch. A pair of variolossers are provided to control the gain of a pair of amplifiers, one amplifier providing a one-way signal gain in a first line branch and the other amplifier providing a one-way signal gain in a second line branch. If the line monitor detects a fluctuation in signal strength on the monitored line branch, the control circuit changes the impedance of both variolossers in a manner which compensates for the fluctuation. This, in turn, adjusts the gain of both amplifiers to compensate for the fluctuation on both line branches. To take the greatest advantage of the invention, the monitor is coupled into the line branch which is connected to the more reliable signal source in the central office.

The advantage of the invention should now be clear. The receiver knows the strength of the signal received from the central office; therefore, it also knows the attenuation of the line looking into the central office. However, there is no way for the associated transmitter to know the attenuation of the line into which it is driving. If the transmitter had to drive at a predetermined gain, it may be pre-adjusted to compensate for the permanent and known losses, but it cannot compensate for ambient fluctuations. According to the invention, the receiver detects such ambient fluctuations as they occur, and compensates for them immediately. Since the transmit and receive line branches experience identical ambient fluctuations, the transmitter may be adjusted as a function of received signal strength fluctuations to compensate for changes in the ambient attenuation of the line into which it is driving. The advantage, therefore, lies in the ability of the circuit to transmit a signal having a strength which will cause the transmitted signal to be received at a more constant level.

Figure 2:
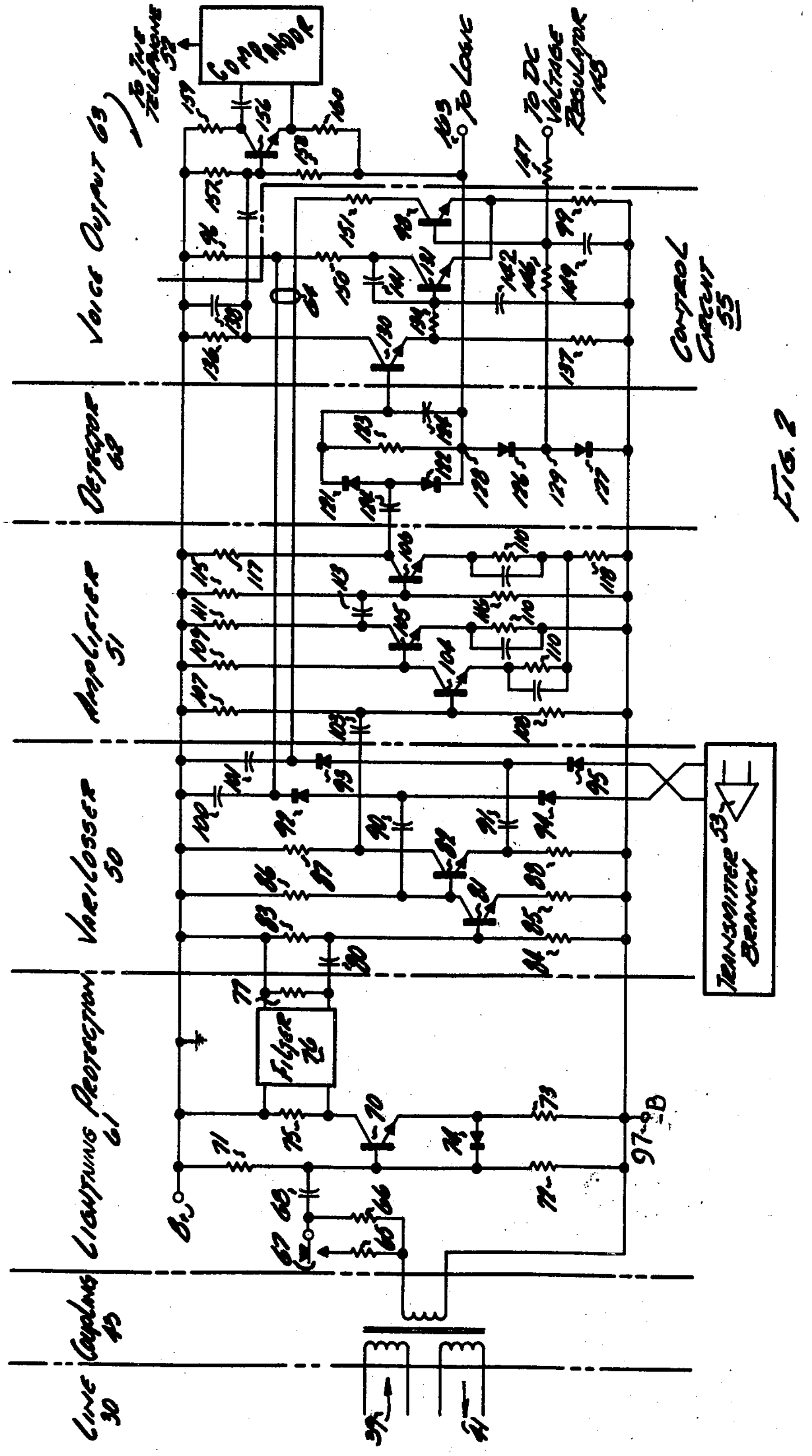

The above mentioned and other features and objects of this invention and the manner of obtaining them will become more apparent and the invention itself will be best understood by reference to the following description of an embodiment of the invention taken in conjunction with the accompanying drawings wherein:

FIG. 1 is a block diagram which shows a portion of a telephone central office and a subscriber carrier line; and FIG. 2 is a schematic circuit diagram showing a variolosser control circuit combination for use in the system of FIG. 1.

A subscriber carrier system (FIG. 1) includes a communication line 30, 31 running between a central offce 32 and a number of subscriber stations such as 33. Line 30 conducts in a west to east direction and line 31 conducts in an east to west direction. Distributed along the line are a number of repeater stations (first and last of which are drawn at 34, 35).

Each repeater station includes a pair of amplifiers 36, 37 for conducting and amplifying signals transmitted in opposite directions. Thus, amplifier 36 conducts signals, in the upper line branch 30, in the direction indicated by the arrow 39, and amplifier 37 conducts signals in the lower line branch 31, in the direction 41.

Each of the subscriber stations is coupled into the line 30, 31 via hybrid or transformer couplings, as at 43, 44. An exemplary three such hybrid circuits are shown in each line 30, 31 to indicate that three subscriber stations are provided. The distance is random between either the central office 32 or a previous repeater, and the line coupling (such as 43, 44) to any particular subscriber line. Thus, the amplifiers receive signals over lines which may be long or short, buried cable, microwave or radio link, pole line etc.

To compensate for these and other variations which attenuate signals in the line 30, 31, a control device 45 is provided for adjusting the gain of the repeater 34 in both directions by exercising control over a pair of variolossers 46, 47. The term "variolosser" is well known in the telephone art. It describes an attenuation device which automatically increases or decreases its attenuation as a function of the output signal of a control device. This control device is adapted to compensate automatically and almost immediately for all fluctuation in the line signal which cause a need for gain control.

In keeping with an aspect of the invention, the signal 39 incoming from the central office 32 is monitored continuously. If the strength of that signal increases or decreases, the control device 45 changes its output condition to increase or decrease the amplification or attenuation of the variolossers 46, 47, and therefore the gain of the repeater 34. An assumption of the invention is that the same type of equipment was installed in the upper and lower line branches 30, 31 at the same time and in the same manner, and that each line branch experiences the same ambient environmental changes. Therefore, any attenuation experienced by line signal 39 in the upper branch 30 are also experienced by the signal 41 in the lower branch 31. Hence, if control circuit 45 makes a gain correcting adjustment for variolosser 46, the same adjustment will automatically be the proper gain correcting adjustment required by the variolosser 47. An advantage of this arrangement is that the central office controls the signal 39 which is sent out over line 39 so that it is a well regulated, stable signal. Whereas, the signal 41 comes from the subscriber stations and it may not be so stable.

FIG. 1 shows three exemplary subscriber station connections. In reality, any number of subscriber stations may be connected to the line. Each subscriber station includes the combination of circuit elements shown at 33 plus a number of other well known components which are irrelevant to the invention such as filters, pads, and the like.

The subscriber station circuit elements includes a variolosser 50, an amplifier 51, a telephone instrument 52, an amplifier 53 and a variolosser 54. An output of the amplifier 51 also drives into a control circuit 55 which controls the variolossers 50, 54. Thus, the gains or losses of both the input and output variolossers are controlled by the same control circuit 55. The output of the control circuit 55 is, in turn, controlled as a function of the strength of the incoming signal received by hybrid 43, and taken from the output of the amplifier 51.

By inspection, it should be apparent that the control circuit 45, 55 perform similar functions in similar manners with similar advantages. The only significant differences between these circuits 45, 55, lies in the differences required to serve a carrier line or a subscriber station. Therefore, both of these control circuits may be understood from the following description of circuit 55.

Among other things, FIG. 2 shows the circuit elements adapted to provide the functions disclosed by blocks 50, 51, 55 in FIG. 1. Dot-dashed lines divide this figure into parts according to the logic performed by the parts. More specifically, these parts include line 30, a hybrid coupling 43, a lightning protection input filter, and amplification circuit 61, the variolosser 50, amplifier 51, a detector 62, and the voice output and control circuits. The voice signals pass through the voice output circuit 63, and the variolosser control signals are sent from circuit 55 via wires 64. The same parts have the same reference numbers in FIGS. 1 and 2.

The subscriber line has an incoming branch carrying the signals 39 and an outgoing branch carrying signals 41. These lines are coupled into the electronic circuitry at a transformer coupling 43 which could be part of a well known hybrid network.

In the absence of an incoming carrier signal 39, the variolosser 50 should have a minimum attenuation. In the presence of the strongest anticipated incoming carrier signal 39, the variolosser 50 should have a maximum attenuation. In between these two extremes, the variolosser's attenuation should have an appropriate intermediate value. The gains of both the incoming variolosser 50 and the outgoing variolosser 54 are adjusted by the control circuit 55 as a function of the strength of the incoming signal 39.

To provide a high-low selection of operating ranges, the lightning protection and input filter circuit 61 includes a pair of resistors 65, 66 which are selectively arranged, by means of a manual switch 67, to provide a given input impedance. The switch 67 is operated at the time of installation to compensate roughly for variations in the length of the line between this circuit and the preceding circuitry. The resistors 65, 66 also tend to limit current surges caused by lightning and other natural causes.

A coupling capacitor 68 applies an A.C. input signal to a transistor 70 biased as an amplifier used in a common emitter configuration. Resistors 71, 72 are arranged as a voltage divider used for establishing a base bias. Resistor 73 provides an emitter bias and a feedback signal. The diode 74 is poled to pass current surges around the transistor 70 if such surges have a polarity that would damage the transistor 70. Resistor 75 is used as both a collector load an an input impedance matching for a filter 76. The output impedance of the filter 76 is set by the resistor 77.

The filter 76 is turned to the frequency of the carrier forming the particular channel that is assigned for the use of the subscriber 52. Thus, the only signals feeding through a coupling capacitor 80 are those of the pertinent carrier, assigned to this particular subscriber and modulated with the incoming voice signals.

The variolosser 50 includes a pair of NPN transistors 81, 82 coupled in common emitter configurations, respectively. The transistor 81 amplifiers and the transistor 82 serves as an output impedance matching circuit. The resistors 83, 84 form a voltage divider for biasing the base of the transistor 81. Its emitter bias and feedback are appied through resistor 85. Resistor 86 is a collector load. The transistor 82 has its base electrode coupled to the collector of the transistor 81. The resistors 87, 88 provide collector and emitter loads for the transistor 82. The capacitors 90, 91 couple the collector of transistor 81 and the emitter of the transistor 82 to a pair of diodes 92, 93 respectively. These diodes are used to provide the variolosser function. The diodes 94, 95 provides a similar function in the variolosser in the transmitter side of the subscriber station. Hence, the output of the transmitter is controlled as a function of the output of the receiving amplifier.

The principle is that the resistances of the diodes vary inversely as a function of the A.C. current through them. Therefore, the gain of the transistor 81 is established by the ratio of the resistance 85 to the impedance of the diode 92. Likewise, the gain of the transistor 82 is established by the ratio of the resistance 87 to the impedance of the diode 93. The diodes 94, 95 perform a similar function for amplifying transistors in the transmitter variolosser since they are coupled into a circuit similar to transistors 81 and 82.

The D.C. bias for the diodes 94, 92 is applied over a circuit traced from a ground (not shown) in transmitter 53 through diodes 94, 92 and resistor 150 and transistor 131 to B battery 97. A similar D.C. bias may be traced from a battery in transmitter 53 through diodes 95, 93, a transistor 98 and resistor 99 to B−. The capacitors 90, 91 block D.C. bias potential between the transistors 81, 82 and diodes 92–95. The capacitors 100, 101 block D.C. between the diodes 92, 93 and the B+ supply.

The operation of the varioloser may now be apparent from an inspection of FIG. 2. That is, the collector current of the transistor 81 is carried by a three-branch current divider comprised of (a) the resistor 86 (b) the capacitor 90, and diode 92, and (c) the base of transistor 82. If the A.C. impedance of the diode 92 goes down, this collector current divides so that a greater portion of the current is drawn through diode 92. This sucks current away from the base of transistor 82 and lowers the strength of its output signal. The converse happens when the impedance of the diode 92 goes up to reduce the current through it and to force more current into the base of transistor 82. This increases the amplifier gain and raises the signal strength.

The diode 93 works into the emitter of the transistor 82. Therefore, the effect on the total amplification which is produced by the diode 93 is opposite to the effect on total amplification which is produced by the diode 92. If the diode 93 begins to conduct more heavily, it pulls more emitter current which greatly increases the collector current through the capacitor 103. This increased current drives into the base of an input transistor in the amplifier 51, thereby increasing the output of the amplifier stage. If diode 93 begins to conduct less heavily, it draws less emitter current from transistor 82. The collector current goes down and reduces the current through capacitor 103. This, in turn, reduces the output of the amplifier 51.

The amplifier 51 includes three transistors 104, 105 and 106, all connected in a common emitter configuration. These three transistors 104, 105, 106 amplify the voice signals in a conventional manner. The incoming signal is applied to this amplifier stage via the coupling capacitor 103. The base of the transistor 104 is biased by means of a voltage divider 107, 108. Resistor 109 is a load for transistor 104 and provides a base bias for the transistor 105. Each of the three emitter bias resistors 110 is shunted by a relatively large capacitor to by-pass A.C. voice signals to ground without giving a negative feedback. Each of these three R-C circuits perform a similar function with respect to the corresponding three transistors 104, 105, 106 respectively. For signal transfer, the base of the transistor 105 is coupled directly to the collector of the transistor 104. Resistor 111 is a collector load. Capacitor 113 is a voice signal coupling connected between the base of the transistor 106 and the collector of the transistor 105. Resistors 115, 116 form a voltage divider for setting the base bias for the transistor 106. The resistor 117 is a collector load. The three transistors 104, 105, 106 employ a common emitter bias resistor 118 which provides a stabilizing negative feedback for the entire amplifier stage. The resistive value of resistor 118 is held at a sufficiently low level to maintain an analog feedback current without allowing a Schmidt triggering effect.

The detector circuit 62 responds to these incoming signals and demodulates them to derive the original voice signal. Detector 62 includes a coupling capacitor 124, a pair of diodes 121, 122, a resistor 123, and a capacitor 124. The circuit values of these components are selected empirically on a basis of (1) efficiency, (2) frequency response, and (3) expediency for resolving other circuit and economic needs.

A pair of diodes 126, 127 are part of a temperature compensation circuit which provides a bias for detector 62 and the various transistors in the succeeding circuits. The circuit configuration is such that these diodes experience equal and opposite effects responsive to ambient temperature changes. Thus, the bias voltage remains stable at the points 128, 129 despite any ambient temperature fluctuations which may occur.

The control and voice output circuits 55, 63 are divided into parts by a dot-dashed line. The circuit 63 carries the voice signal, and the circuit 55 provides the varioloser control and ringing currents.

The circuit 55 includes three NPN transistors, of which the transistor 130 operates in a manner that combines the effects of a common emitter and an emitter follower, and the transistors 131 and 98 are operated in Schmidt trigger configuration. The remaining components in the control circuit 55 include a pair of resistors 136, 137 which cooperate with the transistor 130 to provide two load circuits. The capacitor 138 passes to ground any carrier current remaining after the incoming signal was demodulated in circuit 62. The resistor 134 provides an impedance matching function for coupling the emitter of transistor 130 to the base of the transistor 131. The capacitors 141, 142 by-pass the voice signals and dial pulses to give an immunity between the voice and the signal currents. Using the Miller integrator effect, the transistor 131 multiplies the capacitance of 141 by the gain of the stage. A Miller integrator circuit is described on page 458, and elsewhere in a book entitled "Reference Data for Radio Engineers" (4th ed.) published by the International Telephone and Telegraph Corporation of New York City.

A voltage divider 146, 147 is coupled between the temperature stabilized point 129 and a well regulated D.C. voltage supply 148 to bias the base of the transistor 98. The well regulated power supply is used to establish the threshold voltage at which the Schmidt trigger circuit will trigger. Capacitor 149 is an A.C. by-pass to ground used for noise cancellation. Resistor 99 provides the common emitter bias which makes the transistors 131, 98 function as a Schmidt trigger.

The resistors 150, 151 coupled into the output of the Schmidt trigger circuit, are used to produce a voltage drop and, thereby reduce power dissipation in the transistors. The resistor 96 also provides a second load for transistor 131 and is here used to establish proper voltages. This resistor 96 serves practical engineering needs and has no specific logical function.

The voice circuit 63 includes a transistor 156 which operates as both a common emitter and an emitter follower. The two resistors 157, 158 form a voltage divider for setting the D.C. bias at the base of the transistor 156. The resistors 159, 160 function as collector and emitter loads for the transistor 156. To secure the benefit of the voltage which is stabilized against ambient temperature variations, the emitter bias for the transistor 156 is applied over a circuit extending through resistor 160, point 128, and diodes 126, 127 to ground.

The circuit of FIG. 2 operates this way. Assume first that there is either no incoming carrier signal 39 on the line 30 or a lower than threshold carrier signal on that line. The Schmidt trigger transistors 131, 98 are standing so that the transistor 98 is turned on and transistor 131 is turned off. With transistor 98 conducting, a somewhat negative voltage is applied through the resistors 99 and 151 to bias the diodes 93, 95 toward a condition of heavy current conduction. The ratio of the impedance or resistive values of diode 93 and resistor 88 is such that the amplifier combination of transistors 81, 82 has maximum gain. The signal feeding through the capacitor 103 is at maximum strength.

As the strength of the incoming A.C. signal increases the effective resistance of the diodes 92, 93 decreases. Thus, assuming that the input signal comes in strongly and exceeds a threshold value, the amplifier gain goes up to cause the transistor 98 to conduct more heavily. Since both of the transistors 131, 98 are now drawing a heavy current through the emitter bias resistor 99, the voltage drop across it is increased sharply to reduce the emitter bias to the transistor 98. The well known Schmidt trigger action occurs. Transistor 131 turns on and transistor 98 turns off. The negative bias formerly applied through transistor 98 and resistor 151 is removed from the cathode of diode 93. Instead, a negative bias is applied to the cathode of the diode 92. The diode 93 turns off, responsive to the disappearance of the bias, and the diode 92 turns on responsive to the appearance of the bias.

The A.C. signal is now acting upon the transistor 81 which regulates the current in the path traced from ground through the resistor 85, transistor 81, capacitor 90, diode 92 and resistor 96 to battery. The current through the transistor 81 divides between (a) the circuit traced through resistor 86 to the B+ battery 97, (b) the circuit traced through the capacitor 90, diode 92, and resistor 96 to the B± battery, and (c) the circuit into the base of the transistor 82. This increase in current through the diode 92 draws current from the base of the transistor 82. Also, affecting the operation is the change in the effective ratio of the resistive values at 85 and 92. These changes cause the amplifier gain to go down for the combination of the amplifying transistors 81, 82. Thus, the signal fed through the capacitor 103 has a reduced strength.

For those who like a mathematical explanation, current (I) fed through the diode 92 or 93, has the following well known relationship to the signal current ($I_s$):

$$I=I_s(e^{KV}-1)$$

where the value $(e^{KV}-1)$ is a time variable factor.

Solving for V, $$V=\frac{1}{K}\log\left(\frac{I}{I_s}+1\right)$$

The A.C. resistance $R_{ac}$ is equal to the first derivative:

$$R_{ac}=\frac{dv}{dt}=\frac{1}{K(I+I_s)}$$

Considering the grain in the amplifiers 81, 82, the diode current I is very much larger than the signal current $I_s$.

$$R_{ac}+\frac{v}{t}\text{ is closely equal to }\frac{1}{KI}$$

and for all practical purposes $R_{ac}$ varies inversely with I.

The current through capacitors 90, 91 divides between the diodes 92, 94 and 93, 95, respectively. Therefore, the variation in the A.C. resistance $R_{ac}$ of the diodes may be used to control the loss of the variolosser 54 in the transmitter as well as in the receiver gain of the subscriber station.

To ring a subscriber station, the carrier of the called station is modulated with the particular ringing current usually used to ring this particular called station. This current is in the demodulation signal appearing at point 128. It is applied to any suitable ringer circuit via the terminal 163.

It is to be understood that the foregoing description of a specific embodiment of the invention is not to be construed as a limitation on its scope.

I claim:

1. A telephone system comprising a first line branch for one way transmission of signals in a first direction, a second line branch for one way transmission of signals in an opposite direction, amplifier means in each line branch for conducting and amplifying signals in the respective line branch, monitoring means for continuously monitoring the signal appearing in one of said line branches, a variolosser coupled to said monitoring means, said variolosser including at least two diodes wherein the impedence of the diodes varies as a function of a control current, a control circuit coupled to said monitoring means and to said variolosser for providing control current to the diodes to vary their impedance as a function of the strength of the monitored signal, and means for adjusting the gain of said amplifier means in both of said branches as a function of the impedance of said variolosser and to compensate in each branch for all amplitude fluctuations in the signal transmitted over one branch.

2. The system of claim 1 wherein said one line branch is connected to a signal source in a central office.

3. The system of claim 1 wherein said first and second line branches are the send and receive legs of a subscriber carrier system and said amplifiers are parts of repeater circuits distributed along said line.

4. The system of claim 1 wherein said first and second line branches are the input and output circuits and said amplifiers are parts of a subscriber carrier station.

5. A telephone system comprising a first line branch for one way transmission of signals in a first direction, a second line branch for one way transmission of signals in an opposite direction, amplifier means in each line branch for conducting and amplifying signals in the respective line branch, means for continuously monitoring the signal appearing in one of said line branches, means responsive to said monitoring means for adjusting the gain of said amplifying means in both of said branches to compensate in each branch for all amplitude fluctuations in the signal transmitted over one branch, said monitor means including a trigger circuit and said gain adjusting means including at least two diodes coupled into a circuit wherein the impedance of said diodes varies as a function of the strength of an input signal, means for operating said trigger circuit to a first condition when the strength of said monitored signal is below a threshold value and to a second condition when said signal strength is above said threshold value, and means responsive to the condition of said trigger circuit for back biasing one of said diodes and forward biasing the other of said diodes whereby the forward biased diode assumes command over said gain adjusting means depending upon the threshold level of said signal.

6. The system of claim 5 wherein said gain adjusting means includes two pair of diodes, the two diodes in each of said pairs assuming the same back or forward bias at any given time, one diode in each pair being individually associated with the amplifier in one of said branches and the other diode in each pair being individually associated with the amplifier in the other of said branches, and means in each of said amplifiers for adjusting the gain of that amplifier as a function of the impedance of the diodes associated therewith.

References Cited

UNITED STATES PATENTS

| | | | |
|---|---|---|---|
| 1,580,624 | 4/1926 | Nyquist et al. | |
| 2,272,735 | 2/1942 | Bishop | 179—170 |
| 2,567,824 | 9/1951 | Nylund | 179—170 |

KATHLEEN H. CLAFFY, Primary Examiner

W. A. HELVESTINE, Assistant Examiner